US011427959B2

(12) United States Patent
Katagiri

(10) Patent No.: US 11,427,959 B2
(45) Date of Patent: Aug. 30, 2022

(54) RUBBER-REINFORCING CORD AND RUBBER PRODUCT USING SAME

(71) Applicant: Nippon Sheet Glass Company, Limited, Tokyo (JP)

(72) Inventor: Shinya Katagiri, Aichi (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 324 days.

(21) Appl. No.: 15/777,784

(22) PCT Filed: Dec. 16, 2016

(86) PCT No.: PCT/JP2016/005168
§ 371 (c)(1),
(2) Date: May 21, 2018

(87) PCT Pub. No.: WO2017/110076
PCT Pub. Date: Jun. 29, 2017

(65) Prior Publication Data
US 2018/0347109 A1    Dec. 6, 2018

(30) Foreign Application Priority Data

Dec. 21, 2015  (JP) .............................. JP2015-248336

(51) Int. Cl.
*D07B 1/16*   (2006.01)
*D07B 1/02*   (2006.01)
(Continued)

(52) U.S. Cl.
CPC ............. *D07B 1/162* (2013.01); *D02G 3/446* (2013.01); *D07B 1/025* (2013.01); *D07B 1/04* (2013.01);
(Continued)

(58) Field of Classification Search
CPC ................... D07B 221/2003; D07B 221/102; D07B 1/00; D07B 1/005; D07B 1/02;
(Continued)

(56) References Cited

U.S. PATENT DOCUMENTS 3,329,061 A * 7/1967 Momoi ................... D07B 1/02
87/12
3,839,854 A * 10/1974 Carranza .................. D07B 1/02
57/236
(Continued)

FOREIGN PATENT DOCUMENTS

CN          1517485        8/2004
EP          1439262        7/2004
(Continued)

OTHER PUBLICATIONS

International Search Report issued for International Patent Application No. PCT/JP2016/005168, dated Mar. 14, 2017, 5 pages including English translation.
(Continued)

*Primary Examiner* — Shaun R Hurley
*Assistant Examiner* — Bao-Thieu L Nguyen
(74) *Attorney, Agent, or Firm* — Hamre, Schumann, Mueller & Larson, P.C.

(57) ABSTRACT

A rubber-reinforcing cord (10) includes a first fiber strand (11) and a plurality of second fiber strands (12) disposed around the first fiber strand (11). The second fiber strand (12) has a tensile elastic modulus higher by 20 GPa or more than that of the first fiber strand (11).

10 Claims, 2 Drawing Sheets

(51) Int. Cl.
  *D07B 1/04* (2006.01)
  *D02G 3/44* (2006.01)
  *F16G 1/28* (2006.01)

(52) U.S. Cl.
  CPC .......... *F16G 1/28* (2013.01); *D07B 2201/102* (2013.01); *D07B 2201/2033* (2013.01); *D07B 2201/2082* (2013.01)

(58) Field of Classification Search
  CPC . D07B 1/025; D07B 1/04; D07B 1/06; D07B 1/0606; D07B 1/0613; D07B 1/062; D07B 1/0626; D07B 1/0633; D07B 1/064; D07B 1/0646; D07B 1/0653; D07B 1/066; D07B 1/0666; D07B 1/0673; D07B 1/068; D07B 1/0686; D07B 1/0693; D07B 1/08; D07B 1/10; D07B 1/12; D07B 1/14; D07B 1/141; D07B 1/142; D07B 1/144; D07B 1/145; D07B 1/147; D07B 1/148; D07B 1/16; D07B 1/162; D07B 1/165; D07B 1/167; D07B 1/18; D07B 1/185; D07B 1/20; D07B 1/22
  See application file for complete search history.

(56) References Cited

U.S. PATENT DOCUMENTS

| | | | | |
|---|---|---|---|---|
| 4,159,618 A * | 7/1979 | Sokaris | ............... | D02G 3/404 428/364 |
| 4,176,705 A | 12/1979 | Russell et al. | | |
| 6,399,886 B1 * | 6/2002 | Avellanet | ............... | A61M 25/09 174/128.1 |
| 7,080,500 B2 * | 7/2006 | Akiyama | ............... | D02G 3/48 57/212 |
| 7,682,274 B2 * | 3/2010 | Akiyama | ............... | D02G 3/187 428/375 |
| 8,176,719 B2 * | 5/2012 | Furusawa | ............... | D02G 3/447 57/225 |
| 2006/0179813 A1 * | 8/2006 | Vanneste | ............... | D02G 3/48 57/211 |
| 2006/0191619 A1 * | 8/2006 | Meersschaut | ......... | B60C 9/0007 152/537 |
| 2006/0266458 A1 * | 11/2006 | Ishikawa | ............... | B60C 9/08 152/540 |
| 2007/0098983 A1 * | 5/2007 | Akiyama | ............... | D02G 3/187 428/375 |
| 2007/0144134 A1 * | 6/2007 | Kajihara | ............... | D02G 3/447 57/229 |
| 2010/0200142 A1 * | 8/2010 | Wakahara | ............... | B60C 15/04 152/539 |
| 2010/0267863 A1 * | 10/2010 | Furusawa | ............... | D02G 3/447 523/200 |
| 2011/0003150 A1 * | 1/2011 | Measom | ............... | D07B 1/02 428/367 |
| 2011/0192132 A1 * | 8/2011 | Kimura | ............... | D07B 1/02 57/258 |
| 2012/0000590 A1 * | 1/2012 | Cogne | ............... | B60C 9/0007 152/564 |
| 2012/0312444 A1 * | 12/2012 | Domingo | ............... | D02G 3/48 152/556 |
| 2012/0318428 A1 * | 12/2012 | Domingo | ............... | D07B 1/062 152/556 |
| 2013/0217528 A1 * | 8/2013 | Matsumoto | ............... | F16G 1/10 474/263 |
| 2013/0269308 A1 * | 10/2013 | Kurosawa | ............... | D07B 1/02 57/218 |
| 2013/0292027 A1 * | 11/2013 | Sallaz | ............... | D07B 1/062 152/552 |
| 2013/0292028 A1 * | 11/2013 | Sallaz | ............... | D07B 1/062 152/555 |
| 2013/0340913 A1 * | 12/2013 | Sallaz | ............... | B60C 15/06 152/552 |
| 2014/0008003 A1 * | 1/2014 | Sallaz | ............... | D07B 1/062 152/552 |
| 2014/0034208 A1 * | 2/2014 | Kurosawa | ............... | D07B 7/145 156/51 |
| 2014/0073468 A1 | 3/2014 | Knutson et al. | | |
| 2014/0305568 A1 * | 10/2014 | Sallaz | ............... | B60C 9/0007 152/543 |
| 2015/0033694 A1 * | 2/2015 | Facey | ............... | D07B 1/06 57/213 |
| 2015/0233027 A1 * | 8/2015 | Sung | ............... | D02G 3/36 57/216 |
| 2015/0285767 A1 * | 10/2015 | Ouellette | ............... | G01R 33/04 324/240 |
| 2016/0025947 A1 * | 1/2016 | Kwint | ............... | D07B 1/147 264/1.29 |
| 2016/0145776 A1 * | 5/2016 | Roh | ............... | D02G 3/441 57/211 |
| 2016/0322125 A1 * | 11/2016 | Kamoshida | ............... | D07B 1/147 |
| 2016/0377149 A1 * | 12/2016 | Furusawa | ............... | F16G 1/10 474/205 |
| 2017/0114497 A1 * | 4/2017 | Liu | ............... | D07B 1/0613 |
| 2017/0144838 A1 * | 5/2017 | Hou | ............... | B65G 15/36 |
| 2017/0321376 A1 * | 11/2017 | Calvet | ............... | D02G 3/48 |
| 2017/0328000 A1 * | 11/2017 | Hashimoto | ............... | D07B 1/0693 |
| 2018/0105981 A1 * | 4/2018 | Matsumoto | ............... | D07B 1/0673 |
| 2018/0148263 A1 * | 5/2018 | Hou | ............... | D07B 1/06 |
| 2018/0148893 A1 * | 5/2018 | Matsumoto | ............... | D07B 1/0673 |
| 2018/0305182 A1 * | 10/2018 | Zhao | ............... | F16G 5/10 |
| 2019/0062993 A1 * | 2/2019 | Pelto-Huikko | ............... | B66B 7/1261 |

FOREIGN PATENT DOCUMENTS

| | | |
|---|---|---|
| EP | 2380755 A2 | 10/2011 |
| EP | 2380755 A3 | 9/2012 |
| EP | 2865541 | 4/2015 |
| JP | S55120606 U | 8/1980 |
| JP | S61180200 U | 11/1986 |
| JP | 2004285498 A | 10/2004 |
| WO | 2004090224 A1 | 10/2004 |

OTHER PUBLICATIONS

Extended European Search Report issued for European Patent Application No. 16877980.9, dated Oct. 29, 2019, 8 pages.

* cited by examiner

RUBBER-REINFORCING CORD AND RUBBER PRODUCT USING SAME

TECHNICAL FIELD

The present invention relates to a rubber-reinforcing cord for reinforcing a rubber product and a rubber product including the rubber-reinforcing cord.

BACKGROUND ART

Rubber-reinforcing cords formed using reinforcing fibers have been proposed as reinforcing members for reinforcing rubber products such as rubber belts. For example, aramid fibers, nylon fibers, polyester fibers, steel fibers, glass fibers, and carbon fibers are known as reinforcing fibers. A rubber-reinforcing cord is formed of one kind of fibers or a combination of two or more kinds of fibers.

A timing belt used for, for example, driving a cam shaft of an internal combustion engine of an automobile is required to have high dimensional stability to keep proper timing. Additionally, because of growing attention to energy saving of recent years, improvement of transmission efficiency has been strongly demanded not just of timing belts for automobiles but of belts of a variety of apparatuses. Therefore, rubber-reinforcing cords included in such rubber products (rubber belts) are required to have a high elastic modulus.

As a rubber-reinforcing cord having a high elastic modulus, a rubber-reinforcing cord formed of fibers (high modulus fibers) having a high elastic modulus, such as carbon fibers, has also been proposed conventionally. However, high modulus fibers have high flexural rigidity and are thus inferior in bending fatigue resistance. Since rubber products such as rubber belts are repeatedly subjected to bending stress, the performance thereof tends to degrade due to bending fatigue. Therefore, if a rubber-reinforcing cord formed of high modulus fibers is repeatedly subjected to bending stress, the fibers composing the rubber-reinforcing cord are broken due to bending fatigue, which results in fracture of the rubber-reinforcing cord. The fracture of the rubber-reinforcing cord causes degradation of the performance of a rubber product reinforced with the rubber-reinforcing cord, eventually leading the rubber product to dramatically decline in tensile strength and be fractured.

Therefore, in consideration of balance between elastic modulus and bending fatigue resistance, a rubber-reinforcing cord having a double-layer structure composed of a central material disposed in the central portion and a peripheral material disposed around the periphery (the peripheral portion) of the central portion has also been proposed. In this double-layer structure, different kinds of fibers are used for the central portion and peripheral portion. For example, Patent Literature 1 discloses a rubber-reinforcing cord including a carbon fiber strand and a plurality of glass fiber strands disposed around the carbon fiber strand. In this rubber-reinforcing cord, carbon fibers which are high modulus fibers are disposed in the central portion and glass fibers having an elastic modulus lower than that of the carbon fibers are disposed in the peripheral portion. Since the bending stress applied to the carbon fibers is reduced by the glass fibers disposed in the peripheral portion, this structure enables a rubber-reinforcing cord to have an excellent balance between elastic modulus and bending fatigue resistance.

CITATION LIST

Patent Literature

Patent Literature 1; WO 2004/090224 A1

SUMMARY OF INVENTION

Technical Problem

However, the rubber-reinforcing cords having the above conventional structures have the following problem. As described above, in the case of the above conventional rubber-reinforcing cord formed of high modulus fibers, the fibers composing the rubber-reinforcing cord are broken due to bending fatigue, which results in fracture of the rubber-reinforcing cord. Furthermore, the fracture causes degradation of the performance of a rubber product reinforced with the rubber-reinforcing cord, eventually leading the rubber product to dramatically decline in tensile strength and be fractured. Fracture of the rubber-reinforcing cord and rubber product due to such a cause often occurs suddenly and at once when the rubber-reinforcing cord and rubber product are used under high tension. It is therefore very difficult to predict the occurrence of fracture. Thus, sudden fracture of the rubber-reinforcing cord and rubber product even leads to breakdown of equipment where the rubber product is installed. This problem arises with not only the rubber-reinforcing cord formed only of the high modulus fibers but also the rubber-reinforcing cord including the plurality of kinds of fibers. The above conventional double layer rubber-reinforcing cord including the plurality of kinds of fibers has an improvement in keeping an excellent balance between elastic modulus and bending fatigue resistance. However, no solutions have been provided for the above problem; that is, the fact remains that fracture of the rubber-reinforcing cord attributable to a fiber break and that of a rubber product including the rubber-reinforcing cord occur at once and thus it is difficult to make a fracture prediction.

Therefore, an object of the present invention is to provide a rubber-reinforcing cord having a high elastic modulus, designed not to fracture at once, and making it possible to prevent a rubber product including the rubber-reinforcing cord from fracturing at once and allow a fracture prediction. Another object of the present invention is to provide a rubber product allowing a fracture prediction and thereby enabling prevention of breakdown of equipment where the rubber product is installed.

Solution to Problem

The present invention provides a rubber-reinforcing cord including:
 a first fiber strand; and
 a plurality of second fiber strands disposed around the first fiber strand, wherein
 the second fiber strand has a tensile elastic modulus higher by 20 GPa or more than a tensile elastic modulus of the first fiber strand.

The present invention also provides a rubber product including:
 a rubber matrix; and
 the above rubber-reinforcing cord of the present invention, the rubber-reinforcing cord being embedded in the rubber matrix.

Advantageous Effects of Invention

In the rubber-reinforcing cord of the present invention, the second fiber strand disposed around the periphery (the peripheral portion) of the first fiber strand has a tensile elastic modulus higher by 20 GPa or more than that of the first fiber strand disposed in the central portion. Of the first and second fiber strands composing the rubber-reinforcing cord, the second fiber strand has a higher elastic modulus, and thus provides the rubber-reinforcing cord of the present invention with a high elastic modulus. On the other hand, the elastic modulus of the first fiber strand located in the central portion is lower than that of the second fiber strand, and thus a load resulting from the tension applied in the longitudinal direction of the rubber-reinforcing cord is hardly applied to the first fiber strand. Furthermore, located in the center of the reinforcing cord, the first fiber strand is less subjected to the bending stress (tensile stress and compressive stress) applied to the reinforcing cord by bending. The rubber-reinforcing cord of the present invention, in which the second fiber strand having a higher elastic modulus is located in the peripheral portion and the first fiber strand having a lower elastic modulus is located in the central portion, is less likely to experience the phenomenon in which the first and second fiber strands are broken at almost the same time. That is, there is a time lag between break of the first fiber strand and that of the second fiber strand. As a result, the phenomenon in which the rubber-reinforcing cord of the present invention and a rubber product reinforced therewith fracture at once without prior warning is less likely to occur, and some prior warning attributable to a partial break of the rubber-reinforcing cord appears before the rubber-reinforcing cord and rubber product fracture. As described above, the present invention can provide a rubber-reinforcing cord having a high elastic modulus, designed not to fracture at once, and making it possible to prevent a rubber product including the rubber-reinforcing cord from fracturing at once and allow a fracture prediction. Reinforced with such a rubber-reinforcing cord, the rubber product of the present invention allows a fracture prediction, which consequently enables prevention of breakdown of equipment where the rubber product is installed.

DESCRIPTION OF EMBODIMENTS

Figure 1:
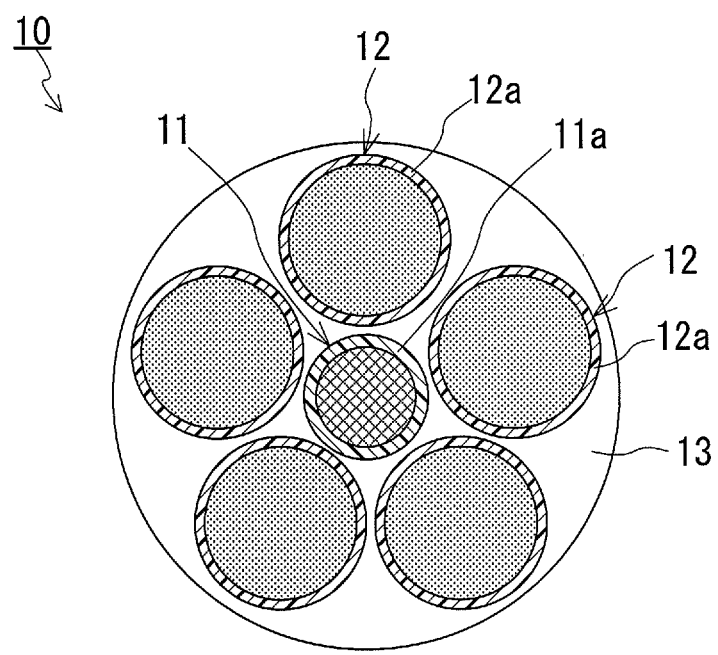
FIG. 1 is a cross-sectional view schematically showing an example of a rubber-reinforcing cord of the present invention.

Hereinafter, embodiments of the present invention will be described in detail.

[Rubber-Reinforcing Cord]

A rubber-reinforcing cord of the present embodiment includes a first fiber strand and a plurality of second fiber strands disposed around the first fiber strand. Moreover, the second fiber strand has a tensile elastic modulus higher by 20 GPa or more than that of the first fiber strand. In other words, the rubber-reinforcing cord of the present embodiment has a double-layer structure composed of the first fiber strand located in the central portion and the second fiber strands located in the peripheral portion, and the fiber strand in the peripheral portion has a tensile elastic modulus higher by 20 GPa or more than that of the first fiber strand. The rubber-reinforcing cord of the present embodiment includes a plurality of kinds of fiber strands having different elastic moduli. Therefore, the second fiber strand having a higher elastic modulus provides the rubber-reinforcing cord with a high elastic modulus, and the first fiber strand having a lower elastic modulus provides the rubber-reinforcing cord with flexibility, namely, bending fatigue resistance.

In the rubber-reinforcing cord of the present embodiment, the second fiber strand is a strand having a tensile elastic modulus higher by 20 GPa or more than that of the first fiber strand, and thus normally serves to resist the tension applied in the longitudinal direction of the rubber-reinforcing cord. Therefore, when the second fiber strand is unbroken and in the normal state, a load resulting from the tension applied in the longitudinal direction of the rubber-reinforcing cord is hardly applied to the first fiber strand. Additionally, since the first fiber strand having a lower elastic modulus is disposed in the central portion and the second fiber strand having a higher elastic modulus is disposed in the peripheral portion in the rubber-reinforcing cord of the present embodiment, most of a load resulting from the bending stress (the tensile stress applied to the outer side of the bending part and compressive stress applied to the inner side of the bending part) imposed on the rubber-reinforcing cord bent is borne by the second fiber strand which is a high modulus fiber located in the peripheral portion. Therefore, when the second fiber strand is unbroken and in the normal state, the load resulting from the stress imposed on the rubber-reinforcing cord bent is hardly borne by the first fiber strand in the central portion.

For the above reasons, in the rubber-reinforcing cord of the present embodiment, the load resulting from the tension applied in the longitudinal direction of the rubber-reinforcing cord and that resulting from the bending stress are applied to the first fiber strand after the second fiber strand in the peripheral portion is broken. Therefore, the first fiber strand has suffered almost no damage from the loads at the time the second fiber strand is broken, and it is very unlikely that the first fiber strand is broken just after the second fiber strand is broken. That is, complete break of the first fiber strand and fracture of the rubber-reinforcing cord do not occur soon after the break of the second fiber strand, and some prior warning attributable to the break of the second fiber strand appears. The term "prior warning" as used, for example, for the case where the rubber-reinforcing cord is embedded in a rubber belt, refers to an unusual noise, sharp decline in transmission efficiency of the rubber belt, or the like. The term "prior warning" as used, for example, for the case where the rubber belt is used for an engine, refers to knocking or the like. As just described, the rubber-reinforcing cord of the present embodiment has a structure in which the first and second fiber strands are unlikely to be broken at almost the same time. Consequently, fracture of the rubber-reinforcing cord and that of a rubber product reinforced therewith are less likely to occur at once without prior warning.

As described above, the rubber-reinforcing cord of the present embodiment has a high elastic modulus, is designed not to fracture at once, and makes it possible to prevent a rubber product including the rubber-reinforcing cord from fracturing at once and allow a fracture prediction.

Hereinafter, the conventional rubber-reinforcing cord in which a fiber strand (high modulus fiber strand) having a high elastic modulus is located in the central portion and a fiber strand (low modulus fiber strand) having a low elastic modulus is located in the peripheral portion will be described for comparison. In such a conventional structure, the high modulus fiber strand in the central portion mainly bears the load resulting from the tension applied in the longitudinal direction of the rubber-reinforcing cord. Furthermore, although the load resulting from the bending stress (the tensile stress applied to the outer side of the bending part and compressive stress applied to the inner side of the bending part) imposed on the rubber-reinforcing cord bent is reduced thanks to the presence of the low modulus fiber strand in the peripheral portion, the high modulus fiber strand in the central portion also needs to bear the load. This means that even at a stage where the low modulus fiber strand in the peripheral portion remains unbroken and stays in the normal state, the load resulting from the tension applied in the longitudinal direction of the rubber-reinforcing cord and that resulting from the bending stress are already applied to the high modulus fiber strand in the central portion and part of the high modulus fiber strand is possibly broken. Therefore, it can be thought that the high modulus fiber strand located in the central portion and having an inferior bending fatigue resistance has already been damaged by the loads at the time the low modulus fiber strand in the peripheral portion is broken. It can be thought that, also in the case where the high modulus fiber strand in the central portion is broken prior to the low modulus fiber strand in the peripheral portion due to the load applied in the longitudinal direction, the low modulus fiber strand in the peripheral portion has already been damaged too by the load at the time the high modulus fiber strand is broken. It follows that the high modulus fiber strand in the central portion is broken immediately after the low modulus fiber strand in the peripheral portion is broken, which causes fracture of the whole rubber-reinforcing cord, or that the low modulus fiber strand in the peripheral portion is broken immediately after the high modulus fiber strand in the central portion is broken, which causes fracture of the whole rubber-reinforcing cord. That is, in the conventional structure, fracture of the rubber-reinforcing cord and that of the rubber product reinforced therewith are likely to occur at once without prior warning.

Additionally, of the conventional rubber-reinforcing cords, the rubber-reinforcing cord composed of one kind of fibers suffers equal damage to every composing fiber during use. A break of a part of the composing fibers thus expands throughout the cord at once, and that causes fracture of the whole rubber-reinforcing cord at once without prior warning. That is, it is naturally understood that fracture of the conventional rubber-reinforcing cord composed of one kind of fibers and that of the rubber product reinforced therewith are likely to occur at once without prior warning.

Hereinafter, the rubber-reinforcing cord of the present embodiment will be described in more detail.

As described previously, a relation between the tensile elastic modulus of the first fiber strand and that of the second fiber strand in the present embodiment is as follows.

Tensile elastic modulus of first fiber strand+20 GPa≤Tensile elastic modulus of second fiber strand The second fiber strand has a tensile elastic modulus higher than that of the first fiber strand by 20 GPa or more, preferably by 30 GPa or more, and more preferably by 40 GPa or more. The upper limit of the difference in tensile elastic modulus between the second fiber strand and the first fiber strand is not particularly limited. However, the limit of the difference in tensile elastic modulus between the second fiber strand and the first fiber strand is desirably 100 GPa or less from the perspective of, for example, preventing an equipment failure. A mechanism in which an equipment failure occurs due to too large a difference in tensile elastic modulus between the second fiber strand and the first fiber strand is, for example, described now. In the case where the difference in tensile elastic modulus between the second fiber strand and the first fiber strand is too large, the first fiber strand (low modulus fibers) composing the core portion bears a load when the second fiber strand (high modulus fibers) composing the skin portion is broken, and thus the whole reinforcing cord is extended. As a result, a rubber product, such as a belt, reinforced with the reinforcing cord is extended. For example, when the rubber product is a timing belt, for which engagement of its teeth with a pulley is important because of its usage characteristics, the timing belt extended too much slips out of engagement and a tooth thereof is separated away (tooth jumping occurs). That results in breakdown of equipment in which the timing belt is installed.

Materials of fibers used for the first fiber strand and second fiber strand are not particularly limited, and a combination of fibers which is capable of satisfying the above relation between tensile elastic moduli can be appropriately selected from fibers known as reinforcing fibers of a rubber-reinforcing cord. The tensile elastic modulus of the first fiber strand and second fiber strand can be adjusted also by twisting. Therefore, materials of fibers used for the first fiber strand and second fiber strand do not necessarily have to satisfy the above relation between tensile elastic moduli by themselves.

Examples of fibers that can be used for the first fiber strand include aramid fibers, glass fibers, and polyester fibers. Among these, aramid fibers are preferably used due to their high tension. The first fiber strand may be composed only of one kind of fibers, or may include several kinds of fibers. It is sufficient for the tensile elastic modulus of the first fiber strand to be lower than that of the second fiber strand by 20 GPa or more, and thus the tensile elastic modulus of the first fiber strand is not particularly limited. However, the tensile elastic modulus of the first fiber strand is preferably, for example, 20 GPa or more, and more preferably 30 GPa or more to maintain elastic modulus of a rubber product and furthermore to maintain the performance of the product even when the second fiber strand is broken. The tensile elastic modulus of the first fiber strand is preferably, for example, 80 GPa or less, and more preferably 60 GPa or less to maintain the bending fatigue resistance of a rubber product, particularly a rubber belt. The diameter of the first fiber strand is preferably 0.30 mm or more, and more preferably 0.40 mm or more to maintain a sufficient strength of the rubber-reinforcing cord when the second fiber strand is broken.

Examples of fibers that can be used for the second fiber strand include carbon fibers, polyparaphenylene benzobisoxazole (PBO) fibers, and steel fibers. Among these, carbon fibers, which have a high tensile strength and high elastic modulus, are preferably used. The second fiber strand may be composed only of one kind of fibers, or may include several kinds of fibers. It is sufficient for the tensile elastic modulus of the second fiber strand to be higher by 20 GPa or more than that of the first fiber strand, and thus the tensile elastic modulus of the second fiber strand is not particularly limited. However, the tensile elastic modulus of the second fiber strand is preferably, for example, 70 GPa or more, and more preferably 80 GPa or more to maintain high transmission efficiency of a rubber product, particularly a rubber belt. The tensile elastic modulus of the second fiber strand is preferably, for example, 500 GPa or less, and more preferably 400 GPa or less to maintain the bending fatigue resistance of a rubber product, particularly a rubber belt.

Examples of the combination of the first fiber strand and second fiber strand include a combination in which the first fiber strand is a fiber strand including aramid fibers and the second fiber strand is a fiber strand including carbon fibers. This combination allows the second fiber strand to be subjected to most of the tensile stress, compressive stress, and bending stress acting inside a rubber product to achieve the effect of protecting the first fiber strand. In this case, the aramid fibers included in the first fiber strand account for, for example, 65 mass % or more, and may account for 76 mass % or more. The aramid fibers included in the first fiber strand account for, for example, 95 mass % or less, and may account for 90 mass % or less. The carbon fibers included in the second fiber strand account for, for example, 76 mass % or more, and may account for 80 mass % or more. The carbon fibers included in the second fiber strand account for, for example, 92 mass % or less, and may account for 88 mass % or less. In the case where the first fiber strand includes a coating, the above-specified mass percentage of the aramid fibers included in the first fiber strand is the mass percentage of the aramid fibers included in the first fiber strand relative to the total mass of the first fiber strand, namely, the sum of the mass of all fibers composing the first fiber strand and the mass of the coating. In the case where the second fiber strand includes a coating, the above-specified mass percentage of the carbon fibers included in the second fiber strand is the mass percentage of the carbon fibers included in the second fiber strand relative to the total mass of the second fiber strand, namely, the sum of the mass of all fibers composing the second fiber strand and the mass of the coating. To more reliably obtain the above effect, a fiber strand consisting of aramid fibers (aramid fibers: 100 mass %) may be used as the first fiber strand, and a fiber strand consisting of carbon fibers (carbon fibers: 100 mass %) may be used as the second fiber strand.

The first fiber strand may be given primary twists, or may not be given primary twists. The bending resistance of the first fiber strand is preferably improved in order that when the second fiber strand is broken and a large load resulting from the bending stress is applied to the first fiber strand, break of the first fiber strand due to the load may be delayed to prevent fracture of the whole cord for as long a time as possible. Hence, it is preferable that the number of twists in the first fiber strand be equal to or greater than that in the second fiber strand in the resultant form of the rubber-reinforcing cord obtained by giving final twists to the first fiber strand and second fiber strands. The number of twists in the first fiber strand of the rubber-reinforcing cord can be, for example, within the range from 1.5 to 4.5 twists/25 mm. The direction of the twists in the first fiber strand is not particularly limited.

The second fiber strand may be given primary twists, or may not be given primary twists. The second fiber strand is desirably given no primary twists. Giving the second fiber strand primary twists can achieve the effect of improving the bending fatigue resistance. On the other hand, in the case where the second fiber strand is an untwisted fiber strand to which no primary twists have been given, the fibers composing the second fiber strand have greater freedom of movement when final twists are given to place the second fiber strands around the first fiber strand. Therefore, when final twists are given, the fibers of the untwisted second fiber strands are spread by a stress acting toward the center of the cord, and thus the untwisted second fiber strands can be disposed along the surface of the first fiber strand, namely to wholly surround the first fiber strand at the center. Thus, the use of the untwisted second fiber strand can enhance the effect of protecting the first fiber strand in the central portion. The direction of primary twists is not particularly limited.

In the rubber-reinforcing cord of the present embodiment, a plurality of the second fiber strands are given final twists to be disposed around the first fiber strand. The number of the final twists can be, for example, within the range from 0.8 to 3.5 twists/25 mm. The direction of the final twists is not particularly limited.

The first fiber strand may include a coating provided on the surface thereof. This coating is provided for the purpose of improving adhesion (adhesion to the second fiber strands, and furthermore, in the case where a plurality of first fiber strands are included, adhesion to other first fiber strands) and preventing fiber fraying. A coating known as a coating of a fiber strand of a rubber-reinforcing cord can be applied. The coating may include, for example, a rubber component. Examples of the coating include a coating formed using a treatment liquid (hereinafter referred to as a "RFL treatment liquid") whose main component is a mixture of a resorcinol-formaldehyde condensate and rubber latex. A RFL treatment liquid known as a treatment agent for a fiber strand of a rubber-reinforcing cord can be applied. The proportion of the coating in the first fiber strand can be selected appropriately according to, for example, a material of the first fiber strand, and the diameter of the first fiber strand.

The second fiber strand may include a coating provided on the surface thereof. This coating is provided for the purpose of improving adhesion (adhesion to the first fiber strand, adhesion to other second fiber strands, and, in the case where the second fiber strand is exposed on the surface of the rubber-reinforcing cord, adhesion to a rubber matrix in which the cord is embedded) and preventing fiber fraying. A coating known as a coating of a fiber strand of a rubber-reinforcing cord can be applied. The coating may include, for example, a rubber component. Examples of the coating include a coating formed using a RFL treatment liquid. A RFL treatment liquid known as a treatment agent for a fiber strand of a rubber-reinforcing cord can be applied. The proportion of the coating in the second fiber strand can be selected appropriately according to, for example, a material of the second fiber strand, the diameter of the second fiber strand, and a rubber matrix of a rubber product in which the rubber-reinforcing cord is to be embedded.

The total cross-sectional area of the second fiber strands is preferably 64% or more and more preferably 80% or more of the sum of the total cross-sectional area of the first fiber strand and that of the second fiber strands. Setting the proportion of the total cross-sectional area of the second fiber strands having a higher tensile elastic modulus to such a range makes it possible to increase the elastic modulus of the whole rubber-reinforcing cord. Therefore, when used to reinforce a rubber belt, the rubber-reinforcing cord can increase the dimensional stability and transmission efficiency of the rubber belt. Meanwhile, the total cross-sectional area of the second fiber strands is preferably 95% or less and more preferably 90% or less of the sum of the total cross-sectional area of the first fiber strand and that of the second fiber strands. Setting the proportion of the total cross-sectional area of the second fiber strands to such a range makes it possible to provide the rubber-reinforcing cord having a sufficient bending fatigue resistance in addition to a high elastic modulus. In the case where the first fiber strand includes a coating, the total cross-sectional area of the first fiber strand is the sum of the cross-sectional area of the fibers composing the first fiber strand and that of the coating. In the case where the second fiber strands include coatings, the total cross-sectional area of the second fiber strands is the sum of the cross-sectional areas of the fibers composing the second fiber strands and those of the coatings.

The rubber-reinforcing cord of the present embodiment may further include a coating (an overcoating) provided on the surface thereof. This overcoating is provided for the purpose of, for example, improving adhesion to a matrix rubber in which the rubber-reinforcing cord is embedded. The overcoating includes, for example, a rubber component. A known coating provided on a known rubber-reinforcing cord for the purpose of improving adhesion to a matrix rubber can be applied as the overcoating.

FIG. 1 shows an example of the rubber-reinforcing cord of the present embodiment. A rubber-reinforcing cord 10 of FIG. 1 includes a first fiber strand 11 disposed in the central portion, a plurality of second fiber strands 12 disposed around the first fiber strand 11, and an overcoating 13 (hatching is omitted) formed to cover all the strands. The first fiber strand 11 includes a coating 11a provided on the surface thereof. The second fiber strands 12 include coatings 12a provided on the surfaces thereof. The coating 11a, coatings 12a, and overcoating 13 can be omitted.

FIG. 1 shows an example in which the number of the first fiber strands 11 is one and that of the second fiber strands 12 is five, but the number of the fiber strands is not limited to the above. The number of the first fiber strands 11 and that of the second fiber strands 12 can be selected according to properties required of the rubber-reinforcing cord and properties of the strands. Preferable examples of the ratio of [the number of the first fiber strands]/[the number of the second fiber strands] include [1]/[3 to 30], [2]/[6 to 30], and [3]/[10 to 40]. In the case where a plurality of first fiber strands are disposed in the central portion, a bundle of the plurality of first fiber strands may be given primary twists, or may not be given primary twists. A plurality of second fiber strands are preferably disposed to surround the first fiber strand so that the first fiber strand will be subjected to as little load resulting from the bending stress as possible.

The rubber-reinforcing cord of the present embodiment can be produced by a known method. An example of the method for producing the rubber-reinforcing cord of the present embodiment will be described hereinafter.

The fiber strand can be formed by bundling fiber filaments. The fiber strand may be given primary twists. A bundle of a plurality of strands may be twisted into a strand. The formed strand may be subjected to certain treatment, such as treatment with a RFL treatment liquid as mentioned above. To form a coating using a RFL treatment liquid, the strand may be subjected to heat treatment after immersed in the RFL treatment liquid. The rubber latex used in the RFL treatment liquid is not particularly limited. For example, an acrylic rubber-based latex, urethane rubber-based latex, styrene-butadiene rubber-based latex, nitrile rubber-based latex, chlorosulfonated polyethylene-based latex, modified latex thereof, or mixture thereof can be used.

The first fiber strand and second fiber strand can be bundled by a known method. For example, the first fiber strand and second fiber strand can be bundled using a guide having a center guide hole and a plurality of peripheral guide holes disposed around the center guide hole. The plurality of peripheral guide holes are disposed at an equal distance from the center of the center guide hole. One first fiber strand or a plurality of first fiber strands are put through the center guide hole. The second fiber strands are put through the peripheral guide holes. The first and second fiber strands may be given primary twists, or may not be given primary twists. By giving these strands final twists to make a bundle, the second fiber strands are disposed around the first fiber strand.

The apparatus for producing the rubber-reinforcing cord of the present embodiment is not limited, and various apparatuses, such as a ring twisting machine, flyer twisting machine, or strander, can be used.

When the above-mentioned coating provided on the surface of the second fiber strand is insufficient by itself to allow the reinforcing cord to have a sufficiently high adhesive strength to a matrix rubber, the overcoating may be further formed on the surface of the rubber-reinforcing cord.

[Rubber Product]

The rubber product of the present embodiment will be described. The rubber product of the present embodiment includes a matrix rubber and rubber-reinforcing cord embedded in the matrix rubber. As the rubber-reinforcing cord, the above rubber-reinforcing cord of the present embodiment is used. As described above, the rubber-reinforcing cord of the present embodiment has both a high elastic modulus and high bending fatigue resistance, is designed not to fracture at once, and makes it possible to prevent a rubber product including the rubber-reinforcing cord from fracturing at once to allow a fracture prediction. Therefore, the rubber-reinforcing cord of the present embodiment allows a fracture prediction, which consequently enables prevention of breakdown of equipment where the rubber product is installed. The rubber product of the present embodiment can be applied to various uses, and is applied to, for example, a rubber belt such as a toothed belt or moving belt, rubber crawler, or tire cord. Reinforced with the rubber-reinforcing cord of the present embodiment, the rubber product of the present embodiment has high dimensional stability and high transmission efficiency. Therefore, the rubber product of the present embodiment is particularly suitable for use in, for example, a timing belt of a vehicle engine. A known method can be applied as a method for producing the rubber product by embedding the rubber-reinforcing cord in the matrix rubber of the rubber product.

Figure 2:
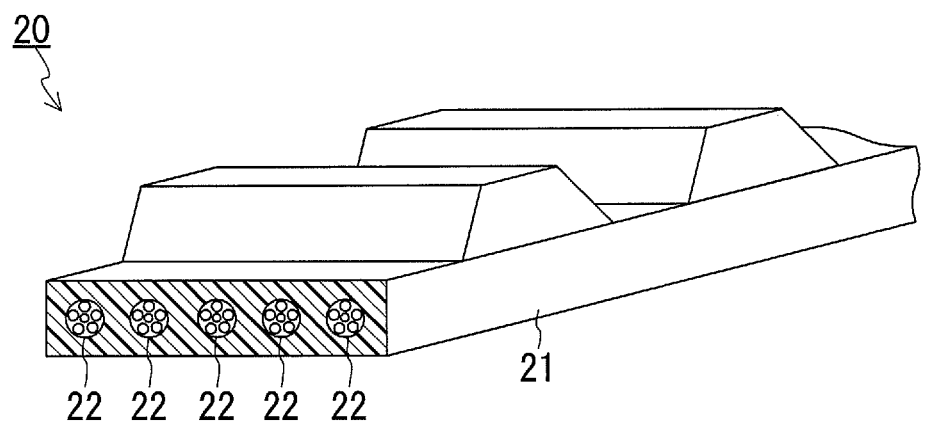
FIG. 2 is a partial exploded perspective view schematically showing an example of a rubber product of the present invention.

An example of the rubber product of the present embodiment will be described. FIG. 2 shows an exploded perspective view of a toothed belt 20. The toothed belt 20 includes a matrix rubber 21 and a plurality of rubber-reinforcing cords 22 embedded in the matrix rubber 21. The matrix rubber 21 is composed of a rubber, or rubber and different material. The rubber-reinforcing cords 22 are the rubber-reinforcing cords of the present embodiment and disposed in parallel to the direction in which the toothed belt 20 moves. Known members can be applied to portions other than the rubber-reinforcing cords 22.

EXAMPLES

Hereinafter, the embodiments of the present invention will be described in more detail by way of Example and Comparative Examples.

Example 1

A carbon fiber strand was impregnated with a RFL treatment liquid and then dried by heat treatment (at 180° C. for 120 seconds). In this manner, a coated carbon fiber strand (coating: 15 mass %) to be used as a second fiber strand was produced. As the carbon fiber strand, a carbon fiber strand (400 tex, tensile elastic modulus: 235 GPa, density: about 1.76 g/cm³, untwisted product, manufactured by Toho Tenax Co., Ltd.) made of a bundle of 6000 carbon fiber filaments (diameter: 7.0 μm) was used. As the RFL treatment liquid, a mixture of a resorcinol-formaldehyde condensate solution (solids content: 8 mass %), vinylpyridine-styrene-butadiene latex (solids content: 40 mass %), and chlorosulfonated polyethylene rubber dispersion (solids content: 40 mass %) in a solid mass ratio of 2:13:6 was used.

As a first fiber strand, a coated para-aramid fiber strand (167 tex, tensile elastic modulus: 70 GPa, density: 1.44 g/cm³, coating: 10 mass %) was prepared. The coated para-aramid fiber strand was produced in the following manner: A para-aramid fiber strand was impregnated with the RFL treatment liquid, subjected to heat treatment (at 180° C. for 120 seconds), and then given primary twists (1.0 twists/25 mm) in the S direction.

Next, three untwisted carbon fiber strands produced in the above manner were disposed around the one para-aramid fiber strand. The strands were given final twists (1.0 twists/25 mm) in the S direction to obtain a cord. In this cord, the total cross-sectional area of the second fiber strands (the sum of the cross-sectional areas of the three coated carbon fiber strands) was 85.0% of the sum of the total cross-sectional area of the first fiber strand and that of the second fiber strands (the cross-sectional area of the one coated para-aramid fiber strand+the sum of the cross-sectional areas of the three coated carbon fiber strands).

Next, a treatment agent having the composition shown in Table 1 was applied onto the above cord and dried to form an overcoating. The overcoating accounted for 3.0% of the total mass (the first fiber strand+second fiber strands+overcoating).

In the above manner, a rubber-reinforcing cord of Example 1 was produced.

TABLE 1

| Component | Proportion (parts by mass) |
|---|---|
| Chemlok 233X (*1) | 100 |
| Xylene | 100 |

(*1) Manufactured by Lord Far East Incorporated

Comparative Example 1

Using a carbon fiber strand and para-aramid fiber strands produced in the same manner as in Example 1, a cord was obtained by disposing six para-aramid fiber strands around one carbon fiber strand and giving the strands final twists (1.0 twists/25 mm) in the S direction. Then, an overcoating was formed on the cord with the same treatment agent as the one used in Example 1 to obtain a rubber-reinforcing cord of Comparative Example 1. That is, the rubber-reinforcing cord of Comparative Example 1 had a structure in which the carbon fiber strand having a higher elastic modulus was used as a first fiber strand in the center and the para-aramid fiber strands having a lower elastic modulus were used as second fiber strands disposed around the first fiber strand.

Comparative Example 2

Four carbon fiber strands produced in the same manner as in Example 1 were given twists (1.0 twists/25 mm) in the S direction to obtain a cord. Then, an overcoating was formed on the cord with the same treatment agent as the one used in Example 1 to obtain a rubber-reinforcing cord of Comparative Example 2. That is, carbon fibers alone were used as reinforcing fibers of the rubber-reinforcing cord of Comparative Example 2.

[Evaluation of Bending Fatigue Resistance]

The rubber-reinforcing cords of Example 1, Comparative Example 1, and Comparative Example 2 were each embedded in a matrix rubber having the composition shown in Table 2 to form a flat belt having a width of 10 mm, height of 300 mm, and thickness of 3 mm. The obtained flat belts were subjected to a bending test in which the flat belts were bent 300,000 times. The bending test was carried out using a bending tester 30 shown in FIG. 3. Each specimen was observed for the condition of the cord in the bent part after the bending test.

Figure 3:
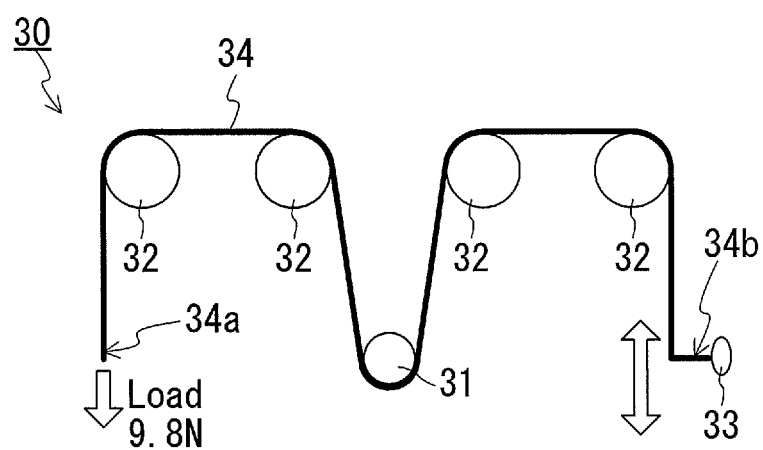
FIG. 3 schematically shows a method of a bending test carried out on rubber-reinforcing cords of Example and Comparative Examples.

The bending tester 30 of FIG. 3 has one flat pulley 31 (diameter: 10 mm), four guide pulleys 32, and a motor 33. First, a produced specimen 34 (flat belt) was hung on the five pulleys. Then, a weight was attached to one end 34a of the specimen 34 to add a 9.8 N load to the specimen 34. In this state, the other end 34b of the specimen 34 was reciprocated by the motor 33 to repeatedly bend the specimen 34 around the flat pulley 31. The bending test was carried out at room temperature. The condition of the cord embedded in the bent part of the specimen having undergone the bending test was observed to see whether the cord remained untorn. The observation results are shown in Table 3 as "Torn or untorn after bent 300,000 times".

TABLE 2

| Component | Mass ratio |
|---|---|
| Hydrogenated nitrile rubber (*1) | 70 |
| Hydrogenated nitrile rubber (*2) containing zinc dimethacrylate | 30 |
| Zinc oxide | 10 |
| Stearic acid | 1 |
| Carbon black | 30 |
| Trioctyl trimellitate | 5 |
| Sulfur | 0.1 |
| 1,3-bis(t-butylperoxy-isopropyl)benzene | 6 |
| Magnesium oxide | 1 |
| 4,4'-(α,α-dimethylbenzyl)diphenylamine | 0.5 |
| Zinc salt of 2-mercaptobenzimidazole | 0.5 |
| Triallyl isocyanurate | 1 |

(*1) Zetpol 2020 (manufactured by Zeon Corporation)
(*2) Zetpol 2000L (manufactured by Zeon Corporation)

[Measurement of Tensile Elastic Modulus]

"Autograph AGS-5 kNX" manufactured by Shimadzu Corporation was used as a measuring apparatus, and "Trapezium" was used as software. The measurement speed was set to 250 mm/min, the distance between grips was set to 250 mm, and the initial load was set to 10 N. A difference between a load at an elongation of 0.3% and that at an elongation of 0.8% was divided by 0.5%, and the resultant value was divided by the cross-sectional area of the cord to calculate the tensile elastic modulus.

TABLE 3

| | | Example 1 | Comparative Example 1 | Comparative Example 2 |
|---|---|---|---|---|
| Structure of cord | Number of carbon fiber strands | 3 | 1 | 4 |
| | Number of aramid fiber strands | 1 | 6 | 0 |
| | Number of final twists in fibers (twists/25 mm) | 1.0 | 1.0 | 1.0 |

TABLE 3-continued

|  | Example 1 | Comparative Example 1 | Comparative Example 2 |
|---|---|---|---|
| First fiber strand (central portion) | Aramid fibers | Carbon fibers | Carbon fibers |
| Second fiber strand (peripheral portion) | Carbon fibers | Aramid fibers | — |
| Tensile elastic modulus (GPa) | 76 | 56 | 80 |
| Torn or untorn after bent 300,000 times | Untorn | Untorn | Torn |

The rubber-reinforcing cord of Example 1 had a high tensile elastic modulus and was able to withstand the bending test of 300,000-time bending. On the other hand, the rubber-reinforcing cord of Comparative Example 2 for which only carbon fibers having a high tensile elastic modulus were used as reinforcing fibers was unable to withstand the bending test of 300,000-time bending, which means the cord of Comparative Example 2 was inferior in bending fatigue resistance.

The rubber-reinforcing cord of Comparative Example 1 was able to withstand the bending test of 300,000-time bending. The rubber-reinforcing cord of Comparative Example 1, however, had a low proportion of the high modulus fibers and did not reach the performance demanded by the market. Therefore, if a rubber product reinforced with the rubber-reinforcing cord of Comparative Example 1 is a belt, it is thought to be impossible for the belt to achieve high transmission efficiency. Moreover, given that the rubber-reinforcing cord of Comparative Example 1 employed the carbon fiber strand having a high tensile elastic modulus as the first fiber strand and the aramid fiber strand having a low tensile elastic modulus as the second fiber strand, it is expected that if the bending test is continued further, the cord is wholly subjected to the loads for the previously described reason (see the explanation on the loads applied to the rubber-reinforcing cord having the structure in which the high modulus fiber strand is located in the central portion and the low modulus fiber strand is located in the peripheral portion) and thus torn apart at once without prior warning. On the other hand, if the reinforcing cord of Example 1, which employed the aramid fiber strand having a low tensile elastic modulus as the first fiber strand and the carbon fiber strand having a high tensile elastic modulus as the second fiber strand, continues to be subjected to the bending test, the first fiber strand in the central portion is not torn apart immediately for the previously described reason even when the second fiber strand in the peripheral portion is broken to be torn apart. Hence, in the case of the rubber-reinforcing cord of Example 1, some prior warning (such as an unusual noise) is expected to appear before the whole cord is fractured.

INDUSTRIAL APPLICABILITY

The present invention is applicable to a reinforcing cord for reinforcing a rubber product and to a rubber product including the reinforcing cord.

The invention claimed is:

1. A rubber-reinforcing cord comprising:
   a first fiber strand; and
   a plurality of second fiber strands disposed around the first fiber strand,
   wherein each of the second fiber strands has a tensile elastic modulus that is higher by 20 GPa or more than a tensile elastic modulus of the first fiber strand, and
   a number of twists in the first fiber strand is equal to or greater than a number of twists in each of the second fiber strands.

2. The rubber-reinforcing cord according to claim 1, wherein a total cross-sectional area of the second fiber strands ranges from 64 to 95% of the sum of a total cross-sectional area of the first fiber strand and the total cross-sectional area of the second fiber strands.

3. The rubber-reinforcing cord according to claim 1, wherein the second fiber strands are given final twists in a range from 0.8 to 3.5 twists/25 mm.

4. The rubber-reinforcing cord according to claim 1, wherein the second fiber strands are not given primary twists.

5. The rubber-reinforcing cord according to claim 1, wherein fibers of the first fiber strand comprise aramid fibers and fibers of each of the second fiber strands comprise carbon fibers.

6. The rubber-reinforcing cord according to claim 5, wherein fibers of the first fiber strand consist of aramid fibers and fibers of each of the second fiber strands consist of carbon fibers.

7. The rubber-reinforcing cord according to claim 1, wherein each of the second fiber strands comprises a coating provided on a surface thereof, and the coating comprises a rubber component.

8. A rubber product comprising:
   a rubber matrix; and
   the rubber-reinforcing cord according to claim 1, the rubber-reinforcing cord being embedded in the rubber matrix.

9. The rubber product according to claim 8, wherein the rubber product is a rubber belt.

10. The rubber reinforcing cord according to claim 4, wherein each of the second fiber strands is formed by bundling fiber filaments.

* * * * *